Jan. 4, 1966    N. R. WILLIAMS    3,227,783
PRODUCTION OF SPHEROIDS
Filed June 6, 1962    2 Sheets-Sheet 1

Jan. 4, 1966   N. R. WILLIAMS   3,227,783
PRODUCTION OF SPHEROIDS
Filed June 6, 1962   2 Sheets-Sheet 2
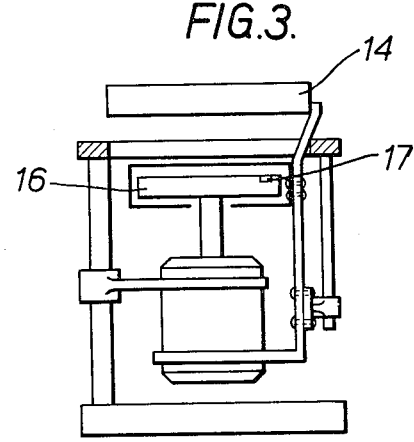
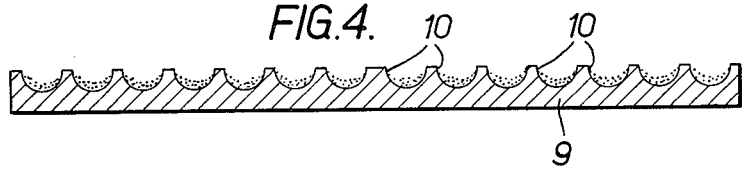
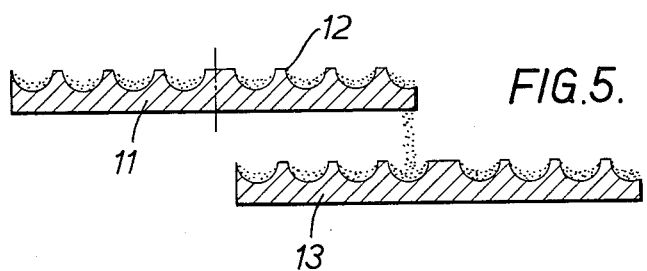
INVENTOR
NEVILLE RONALD WILLIAMS
BY *Larson and Taylor*
ATTORNEYS

United States Patent Office 3,227,783
Patented Jan. 4, 1966

3,227,783
PRODUCTION OF SPHEROIDS
Neville Ronald Williams, Wantage, England, assignor to United Kingdom Atomic Energy Authority, London, England
Filed June 6, 1962, Ser. No. 200,495
Claims priority, application Great Britain, June 12, 1961, 21,153/61
6 Claims. (Cl. 264—.5)

This invention relates to the production of spheroidal particles and is particularly but not exclusively concerned with the spheroidization of irregularly shaped particles of nuclear fuel.

According to the invention a method of producing spheroids comprises placing particles in a circular or annular dish, the inner surface of which is provided with an abrasive surface, vibrating the dish in such a manner as to cause the particles to move around the dish while oscillating up and down a rim of the dish until the particles are spheroidal.

Also according to the invention a method of producing spheroids comprises placing particles in an annular dish having an abrasive surface and applying a gyratory vibration to the dish in a horizontal plane such that the particles move around the dish until substantially spheroidal.

Furthermore according to the invention apparatus for producing spheroids comprises a circular or annular dish, an abrasive lining in said dish and means for applying a gyratory vibration to the dish in a horizontal plane such that particles placed in the dish move around the dish. The dish may be provided with a plurality of abrasive lined circular grooves in its inner surface for large batch production of spheroids or alternatively discs having an abrasive lined spiral groove in their inner surface may be used singly or in series to provide a continuous spheroidising process.

The gyratory vibration such as to cause the particles to move round the dish may be produced by means of an out-of-balance flywheel rotating about a vertical axis in bearings secured to a support for the dish as in known gyratory sieve machines.

To enable the nature of the invention to be more readily understood embodiments of the invention will be described by way of example with reference to the accompanying drawing. In the drawing:

FIG. 3 is a side elevation partly in vertical section of a gyratory sieve machine.

FIG. 4 is a cross sectional view of a multi-groove dish, and

FIG. 5 is a cross sectional view of two multi-groove dishes arranged in cascade.

Figure 1:
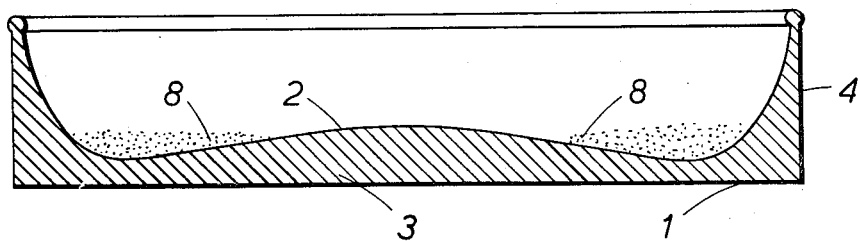
FIG. 1 is a diagrammatic cross-sectional elevation of a shallow track spheroidizing dish.
Figure 2:
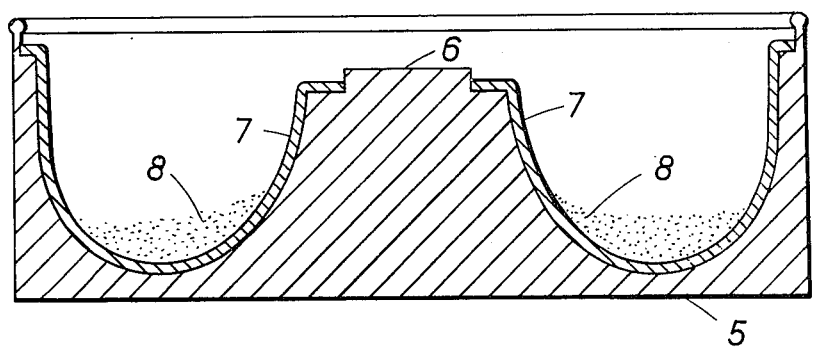
FIG. 2 is a diagrammatic cross-sectional elevation of a deep track spheroidizing dish.

Referring to FIGS. 1, 2 and 3 the dishes of a suitable material, for example papier-mache tufnol, or aluminum, are approximately 8 inches diameter and adapted to fit into a standard sieve section 14 as fitted to a conventional gyratory sieve machine 15. Such machines operate by utilising the forces generated by the rotation of an out of balance flywheel 16 to apply a gyratory vibration to vibrate the sieve section, and the rate of gyration may be adjusted by movement of balance weights relative to the flywheel.

FIG. 1 shows a dish 1 which is provided with a lining of FF grade emery paper 2. The centre of the lining paper is raised to form a crown 3 and the particles 8 to be spheroidized are placed in a groove or trough formed between the crown and the edge wall 4 of the dish.

Details of the production of dense spheroids from $UO_2$ powder using such a dish are as follows.

The powder is ground, using conventional methods, to minus 300 mesh and compacted at 12 tons per square inch to produce pellets 0.4 in. long and 0.4 in. diameter. The pellets are broken down by light tapping and the minus 80 mesh plus 100 mesh particles selected by sieving. The selected particles (200 to 300 grams) are placed in the dish and the dish gyrated. The balance weights on the flywheel of the machine are adjusted such that the particles complete one cycle or rotation of the dish every 4 seconds. During this movement the particles move around the dish, rolling up and down the inclined sides of the track and after eight hours the particles are of substantially spheroidal shape and are subsequently sintered at 1550° to 1600° C. in a cracked ammonia sintering furnace. The sintered spheroids are finally sieved in a 100 mesh screen and collected on a 150 mesh screen, this operation breaking down any closely held agglomerates.

To assist the breaking down of the dense compacted mass into particles of the required size it is advantageous to add 0.1% wt. of aluminium stearate to the milled powder prior to compacting.

FIG. 2 illustrates an aluminium dish 5, having a deep groove suitable for the spheroidising of larger quantities of particles (up to 2 kgs.). The inner surface of the dish is built up to a central crown 6 and the surface 7 forming the groove impregnated with abrasive, for example alumina grit or silicon carbide, 60 to 120 mesh. Preferably the abrasive is applied to the surface with an epoxy resin in a well known manner.

When it is desired to spheroidise large quantities, e.g. 5 to 10 kg. a large multi-groove dish 9 (FIG. 4) approximately 19 inches diameter may be used. The surface is formed with seven concentric annular grooves 10, each groove being lined with suitable abrasive. Using this dish, the balance weights are adjusted to provide a cyclic movement of the particles around the groove every 30 seconds, and particles of a size minus 30 plus 50 mesh may be spheroidized in approximately 9 hours.

If a continuous production of spheroids is required as opposed to batch production as hereinbefore described, a dish 11 (FIG. 5) may be provided with a multi-turn spiral groove 12 extending from the centre of the dish to its periphery. The particles may be fed into the abrasive lined groove continuously, for example at the dish centre, and the movement of the particles along the groove controlled such that the particles are spheroidized when they reach the periphery of the dish. Alternatively the particles may be only partly spheroidized and may be transferred to the centre of a second similarly grooved dish 13 for further spheroidization.

As an example of a series arrangement, dishes 19 in. in diameter each having a close wound spiral groove substantially semi-circular in section and 0.5 in. diameter may be used in a cascade arrangement, approximately 20 dishes being necessary to effect spheroidization.

I claim:

1. Apparatus for producing spheroids comprising an annular dish, an abrasive lining in the dish, and means for applying a gyratory vibration to the dish in a horizontal plane such that particles placed in the dish move around the dish.

2. Apparatus for producing spheroids comprising an annular dish, a plurality of abrasive lined circular grooves in the inner surface of the dish, and means for applying a gyratory vibration to the dish in a horizontal plane such that particles placed in the dish move around the grooves.

3. Apparatus for producing spheroids comprising an annular dish, an abrasive lined spiral groove in the inner surface of said dish, and means for applying a gyratory vibration to the dish in a horizontal plane such that particles placed in the groove move along the spiral.

4. A method of producing spheroids comprising placing particles in an annular dish having an abrasive inner surface and applying a reciprocatory motion in a vertical direction and an oscillatory angular motion in a horizontal plane to the dish.

5. A method of producing spheroids from a powder comprising the steps of
   (a) grinding the powder to minus 300 mesh,
   (b) compacting the powder into pellets,
   (c) breaking the pellets down into particles and selecting —80 mesh plus 100 mesh particles,
   (d) placing the particles in an abrasive surfaced dish, and
   (e) vibrating the dish in such a manner as to cause the particles to move around the dish while oscillating up and down a rim of the dish until the particles are substantially spheroidal.

6. A method of producing spheroids from a $UO_2$ powder comprising the steps of
   (a) grinding the powder to minus 300 mesh,
   (b) adding 0.1% wt. of aluminum stearate to the powder,
   (c) compacting the powder into pellets,
   (d) breaking the pellets down into particles and selecting —80 mesh plus 100 mesh particles,
   (e) placing the particles in an abrasive surface dish, and
   (f) vibrating the dish in such a manner as to cause the particles to move around the dish while oscillating up and down a rim of the dish until the particles are substantially spheroidal.

References Cited by the Examiner

UNITED STATES PATENTS

| 607,368 | 7/1898 | Hathorn | 51—130 |
| 1,508,345 | 9/1924 | Lupo | 51—164 |
| 2,232,444 | 2/1941 | Frenkel | 18—1 |
| 2,882,024 | 4/1959 | Behrens. | |

FOREIGN PATENTS 615,568  2/1961  Canada.

ALEXANDER H. BRODMERKEL, *Primary Examiner.*

JOHN C. CHRISTIE, *Examiner.*

P. E. ANDERSON, *Assistant Examiner.*